(12) United States Patent
Prasad et al.

(10) Patent No.: US 8,235,284 B1
(45) Date of Patent: Aug. 7, 2012

(54) SYSTEMS, METHODS AND APPARATUS FOR RECEIVING IMAGES OF ONE OR MORE CHECKS

(75) Inventors: Bharat Prasad, San Antonio, TX (US); Reynaldo Medina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 13/010,644

(22) Filed: Jan. 20, 2011

Related U.S. Application Data

(63) Continuation of application No. 11/935,592, filed on Nov. 6, 2007, now Pat. No. 7,896,232.

(51) Int. Cl.
*G07F 19/00* (2006.01)
(52) U.S. Cl. ...................................................... 235/379
(58) Field of Classification Search ................... 235/454
See application file for complete search history.

(56) References Cited

U.S. PATENT DOCUMENTS

| | | | | |
|---|---|---|---|---|
| 4,060,711 A | * | 11/1977 | Buros | 235/493 |
| 6,390,362 B1 | * | 5/2002 | Martin | 235/379 |
| 7,299,970 B1 | * | 11/2007 | Ching | 235/375 |

* cited by examiner

*Primary Examiner* — Seung Lee
(74) *Attorney, Agent, or Firm* — Brinks Hofer Gilson & Lione

(57) ABSTRACT

Images of a plurality of checks to be presented for payment may be captured through the use of a check sleeve. The check sleeve includes check-holding mechanism to hold one or more checks in place in the sleeve, and contains various types of markings or other features that allow an image of the sleeve to be oriented, and to allow the portion of the image that represents a check to be distinguished from portions of the image that do not represent a check. One or more algorithms may be used to distinguish check from non-check portions of the image, and to orient the image. The check sleeves may have one or more barcodes imprinted thereon, which may encode various types of information.

20 Claims, 11 Drawing Sheets

SYSTEMS, METHODS AND APPARATUS FOR RECEIVING IMAGES OF ONE OR MORE CHECKS

This application is a continuation of and hereby claims priority under 35 U.S.C. 120 to, pending U.S. patent application Ser. No. 11/935,592, entitled "Systems, Methods and Apparatus For Receiving Images of One or More Checks," filed on Nov. 6, 2007.

CROSS-REFERENCE TO RELATED APPLICATIONS

This application is related by subject matter to the inventions disclosed in the following commonly assigned applications, the entirety of which are hereby incorporated by reference herein: U.S. patent application Ser. No. 11/935,584, and U.S. patent application Ser. No. 11/935,599, each filed on Nov. 6, 2007, and each entitled "Systems, Methods, And Apparatus For Receiving Images Of One Or More Checks."

BACKGROUND

When a check is to be deposited in an account, it has generally been the case that the original physical paper check is presented for payment through a banking system. However, technological and legal developments (e.g., the Check-21 law) have made it possible to present an image of a check for payment in place of the physical paper check. With the availability of this mode of presentment, one issue that arises is how to capture images of the checks to be presented.

It is possible to capture an image of a check with ordinary image capture technology, such as a scanner or digital camera. When such an image is captured, there are typically portions of the image that represent part of a check, and excess portions of the image that do not represent part of the check. A process may be employed to determine which portions of the image represent the check(s) contained in the image.

SUMMARY

A check sleeve, with space to hold one or more checks, may be used to capture an image of a check. The checks sleeve may, for example, be made of a flexible material, such as plastic, and may have mechanisms to hold one or more checks in place in one or more designated spaces. For example, the check sleeve may have a flap or corners that hold a check in place during scanning. The type of flap or corners that are used may be chosen to hold the check in place, while also allowing certain parts of the image to be captured without optical interference—e.g., by having cutouts that directly expose the check in portions that are expected to undergo optical character recognition. The mechanism may also be configured to allow optical detection of the presence or absence of a check within the sleeve.

Markings or other features may be incorporated into the check sleeve to assist in orienting an image of the check to the proper angle, or in distinguishing portions of the image that represent the check from non-check portions. For example, horizontal and vertical lines may be printed on the check whose position on an image can be detected allow the skew angle of the image to be determined and offset. Also, the background of the sleeve may be printed in a color or opacity that is expected to contrast with the checks that are to be placed in the sleeve, thereby providing contrast that can be used to distinguish check portions of the image from non-check portions. Additionally, one or more barcodes can be printed on the sleeve that can encode information such as the type of sleeve, the account number to which the checks are to be deposited, or a digital signature.

A sleeve can be constructed that holds a plurality of checks—e.g., two or three checks—thereby allowing plural checks to be scanned at the same time. However, a sleeve that holds a single check can also be constructed.

DETAILED DESCRIPTION

Image of checks to be presented for payment can be obtained with ordinary scanning equipment, such as a scanner or digital camera. When such an image is to be obtained, a check sleeve can be used to assist in the image capture. The sleeve can have markings that help to identify the boundary of the check within the image, to orient the check image to the proper angle, or to assist in obtaining images of plural checks in a single capture. When an image is captured in this matter, algorithms can be used to distinguish the portions of an image that represent the check from the non-check portions, or to orient the image. Examples of such sleeves and algorithms are described herein.

Figure 1:
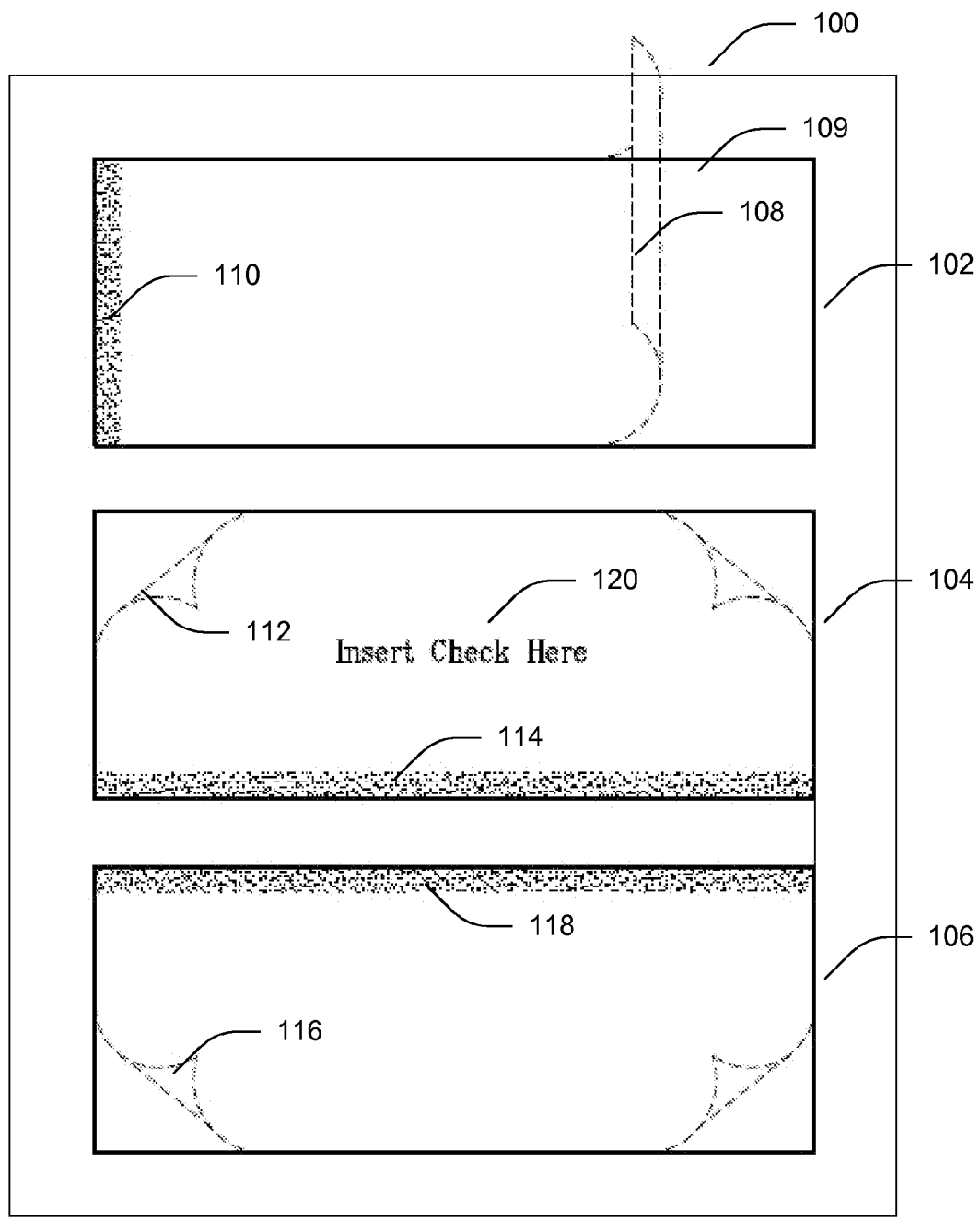
FIGS. 1-3 are plan views of check sleeves demonstrating various example check-holding mechanisms.
Figure 2:
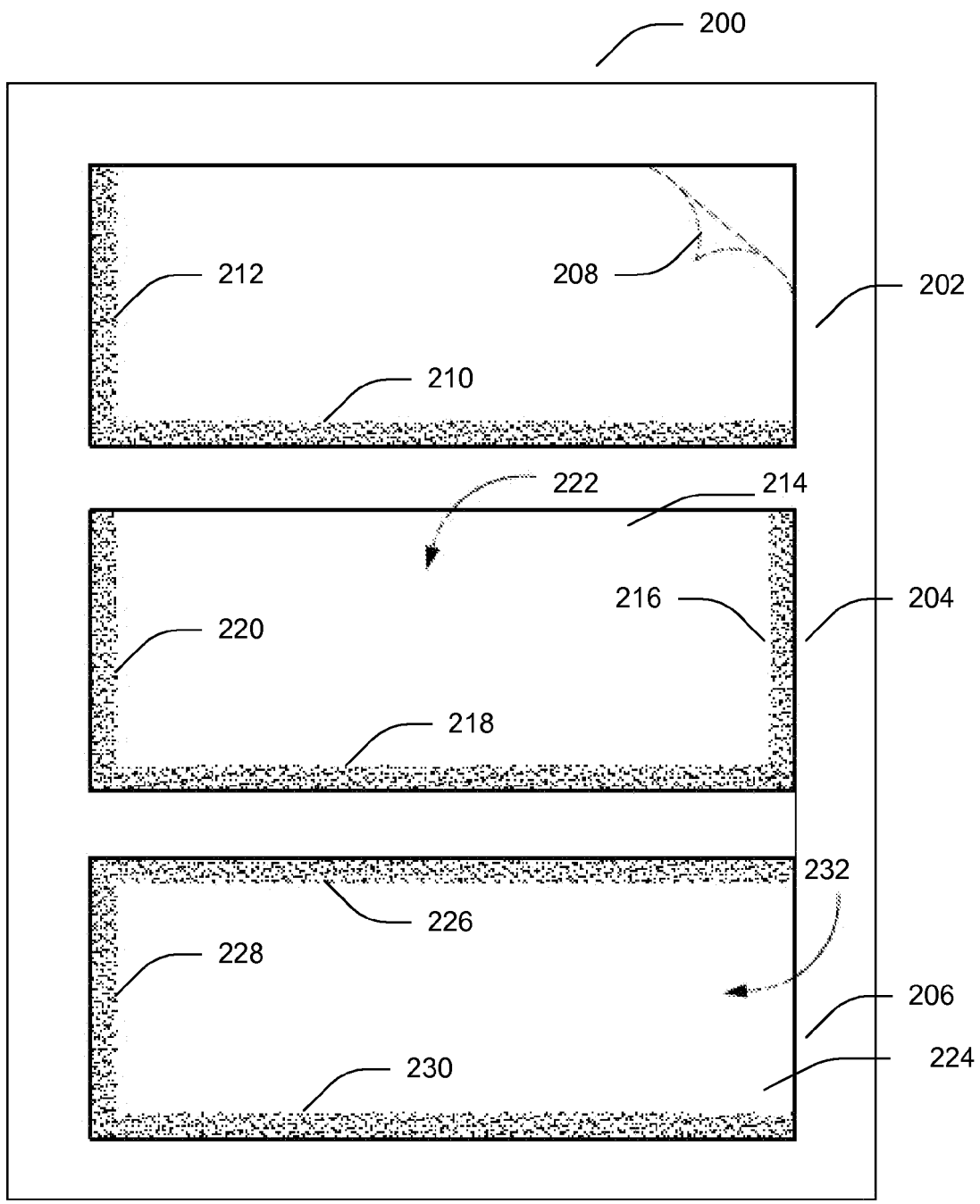
Figure 3:
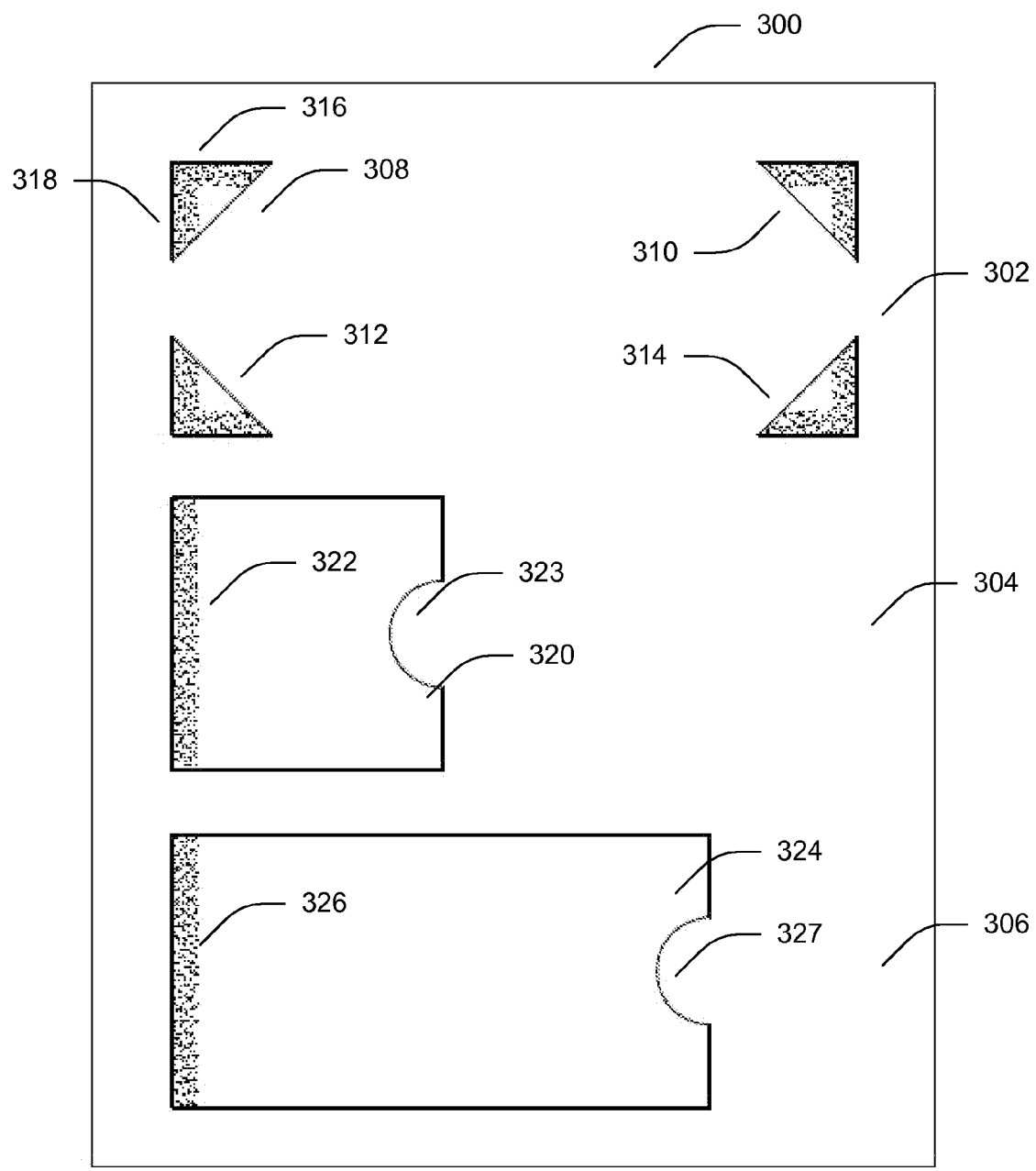

A sleeve to hold one or more checks in place for scanning can be constructed. For example, such a sleeve could be constructed out of a plastic sheet, and the sheet could have one or more mechanisms to hold checks in place. FIGS. 1-3 show example designs of sleeves. In order to show various designs, each of the sleeves shown in FIGS. 1-3 shows three different designs of the mechanism to hold a check in place. However, a production version of the sleeve may have one design replicated in a plurality of places on the sheet. Moreover, the sleeves shown in FIGS. 1-3 show mechanisms to hold three checks in place, which may be appropriate for checks that have the size of a "personal" check. However, a sleeve could be constructed using similar design to hold larger (e.g., business) checks in place. Such a sleeve might have space for two checks instead of three, and might use a landscape orientation of the checks instead of the portrait orientation shown in FIGS. 1-3.

Turning to the drawings, FIG. 1 shows an example of a check sleeve. The sleeve depicted in FIG. 1 comprises a sheet of any type of material (e.g., plastic), and has spaces 102, 104, and 106 to hold three checks in place. In space 102, a flap 108 is attached to cover the area 109 into which a check may be inserted. Flap 108 is attached along a single edge 110. (Throughout FIGS. 1-3, the stipple pattern along an edge indicates that two components are attached along the edge. Flap 108 and sheet 100 are examples of two components whose attachment can be depicted in such a manner.) A check can be inserted between sheet 100 and flap 108. Sheet 100 and flap 108 may be made of a material chosen to keep a check in place through the resistive force of friction or electrostatic interaction. Plastic is an example of a material that may provide the requisite resistive force to hold the check in place.

In space 104, a flap 112 is attached to cover the area into which a check may be inserted. Flap 112 is attached along bottom edge 114. In space 106, a flap 116 is attached along top edge 118.

Each of the flaps 108, 112, and 116 shown in FIG. 1 is attached along a single edge. However, the different positions of the attachment may have different attributes as to their ability to hold a check in place, likelihood that the process of placing the check in a scanner bed will dislodge the check, and user convenience, and thus each placement of the flap represents a different design of the check-holding mechanism. As noted above, a production version of sheet 100 may have three spaces 102, 104, and 106, each with the same check-holding mechanism—e.g., each of the three spaces could have a flap attached along a short side, as does flap 108. However, in order to demonstrate the different mechanism compactly, in the figures three different mechanisms are demonstrated on one sheet.

FIG. 1 depicts a sleeve as shown from the back—that is, if checks were inserted into sleeve 100, the back of the check would be visible in the view shown in FIG. 1. (FIGS. 2 and 3 likewise depict the backs of sleeves.) Most of the information on a check is contained on the front and not the back. Thus, to the extent that a check-holding mechanism involves flaps, corners, etc. that are attached to the sheet, these flaps, corners, etc. can be attached to the back of the sheet to prevent these items from interfering with capturing the image on the front of the check. This method of attaching the flaps, corners, etc., may result in capturing a smoother, less flawed image of the front of the check. However, the flaps, corners, etc., may be attached to the sheet in any manner, and on either side of the sheet.

An image or words may be attached to a flap. For example, flap 112 has the words "Insert Check Here" written on the flap. This image may be used as part of a process of detecting whether a check is present in a particular space. For example, if the words "Insert Check Here" are visible when the front of sheet 100 is scanned, this fact may indicate that no check is present in space 104, a check that is placed between sheet 100 and flap 212 would obscure those words when sheet 100 is viewed from the front. Any type of image or words may be written on a flap to facilitate this type of detection.

FIG. 2 shows another example of a check sleeve. The sleeve shown in FIG. 2 comprises sheet 200. Like sheet 100 (shown in FIG. 1), sheet 200 may be made of any type of material, such as plastic. Sheet 200 has spaces 202, 204, and 206 to hold checks in place. FIG. 2 shows three types of mechanisms for holding checks in place in each of the spaces 202, 204, and 206. In space 202, there is a flap 208, which is affixed to sheet 200 along edges 210 and 212. In space 204, flap 214 is affixed to sheet 200 along three edges 216, 218, and 220. A check is insertable between flap 214 and sheet 200 through the opening indicated by arrow 222, where the opening is along the edge of flap 214 that is not affixed to sheet 200. In space 206, flap 224 is affixed to sheet 200 along three edges 226, 228, and 230. A check is insertable between flap 224 and sheet 200 through the opening indicated by arrow 232, where the opening is along the edge of flap 224 that is not affixed to sheet 200. The opening between flap 214 and sheet 200 is along the top of flap 214, while the opening between flap 224 and sheet 200 is along the side of flap 224. These different positions of the openings represent different designs of a check-holding mechanism.

FIG. 3 shows another example of a check sleeve. The check sleeve shown in FIG. 3 comprises a sheet 300. Sheet 300 has three spaces 302, 304, and 306 to hold checks in place.

FIG. 3 shows three types of mechanisms for holding checks in spaces 302, 304, and 306. In space 302, corners 308, 310, 312, and 314 are each affixed to sheet 300. Each of corners 308, 310, 312, and 304 may be formed of a material, such as plastic, and may be affixed to sheet 300 at each of its edges. For example, corner 308 is affixed to sheet 300 along its edges 316 and 318, and corners 310, 312, and 314 are affixed to sheet 300 similarly. In the example of FIG. 3, four corners are shown to hold a check in place, although one, two, or three corners could also be used.

In space 304, there is a flap 320, which is affixed to sheet 300 along edge 322. Flap 320 has a notch 323, and is not as long as the length of a personal check that would be held in place in space 304. Similarly, in space 306, flap 324 is affixed to sheet 300 along edge 326. Flap 324 has a notch 327. The notches 323 and 327 may assist the user of sheet 300 in handling the flaps to insert the check. Additionally, to the extent that the back of a check would be placed along flaps 320 and/or 324, the fact that flaps 320 and 324 do not extend all the way across the check may help to obtain a clear image of the endorsement on the back of the check. When a check is inserted between flaps 320 or 324 and sheet 300, it would be inserted with the endorsement toward what is depicted as the right-hand side of FIG. 3, so the flaps 320 and 324, due to their length as being less than the length of a check, would not cover the endorsement, and therefore would not introduce optical interference in scanning the endorsement. However, flaps 320 and 324 can be of any length.

Figure 4:
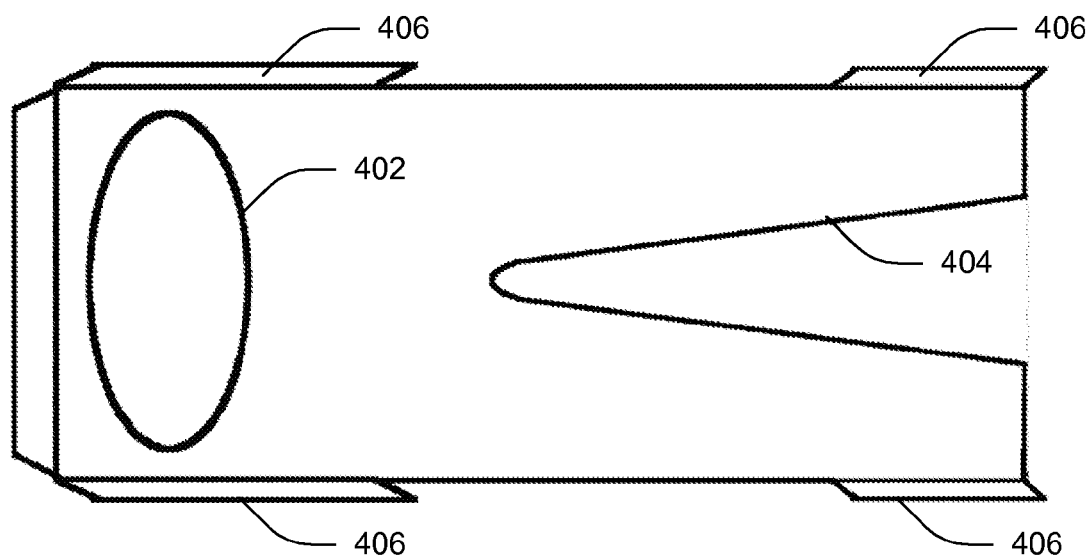
FIG. 4 is a perspective view of an example flap to hold a check in a check sleeve.

In addition to the check-holding mechanisms depicted in FIGS. 1-3, other variations on the mechanisms are possible. For example, FIG. 4 shows an example variation on the design of a flap. Flap 400 has a cutout 402 and a notch 404. Cutout 402 is shown as an ellipse, but could be any shape. Notch 404 is shown as extending slightly more than halfway across the flap, but could be of any length. Cutout 402 can be positioned in the place where a check endorsement expected to be located when a check is placed in a sleeve that employs flap 400. To the extent that the material of which flap 400 is made (e.g., plastic) may have certain reflective and/or luminescent properties, these properties may result in a bright "orb" when the image is scanned with certain types of lighting equipment, and this bright "orb" may interfere with scanning and detecting the endorsement. Leaving the area for the endorsement exposed through cutout 402 may avoid this type of lighting distortion. Tabs 406 are components that can be melted during production of a sleeve to bind flap 400 to a sheet (such as the sheets 100, 200, and 300 shown in FIGS. 1-3). In the example shown in FIG. 4, tabs 406 are positioned such that, if all were melted and used to affix flap 400 to a sheet, the flap would not be retractable to insert the check. In this case, notch 404 could be used by a person to slightly pull back the flap in order to insert the check between flap 400 and a sheet. However, flap 400 could also be attached in such a way as to make it retractable (e.g., by using fewer than all of tabs 406), in which case flap 400 could be retracted by the user to allow the check to be inserted between the flap and a sheet.

Figure 5:
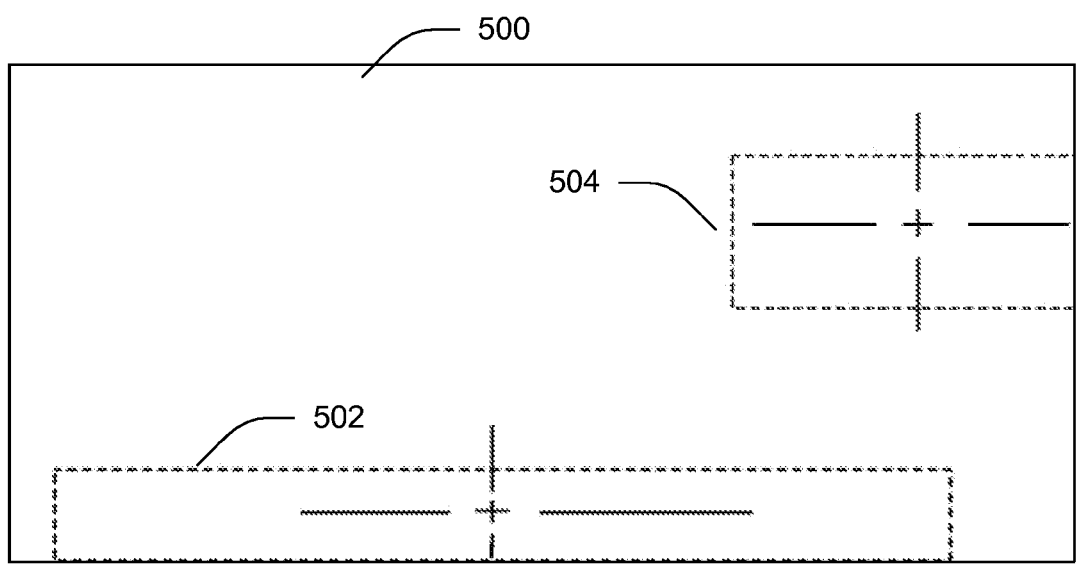
FIG. 5 is a plan view of an example space on a sheet through which the front of a check may be visible.

To the extent that a bright "orb" can interfere with capturing an image, this problem can occur on the front of the check as well as the back. FIG. 5 shows an example of a sheet design that can be used to address this issue on the front of a check. Area 500 is an area of a sheet. As previously described, when a check is inserted into a sleeve, the front of the check is normally visible through the front of the sleeve. In FIG. 5, the area in which a check is to be inserted has cutouts 502 and 504. Cutout 502 is where the Magnetic Ink Character Recognition ("MICR") line of the check is expected to appear when the check is inserted, and cutout 504 is where the numerical amount for which the check is drawn is expected to be written. These areas may be larger than the expected areas of the MICR line and the check amount, in order to account for variations in how the check is placed in the sleeve.

Figure 6:
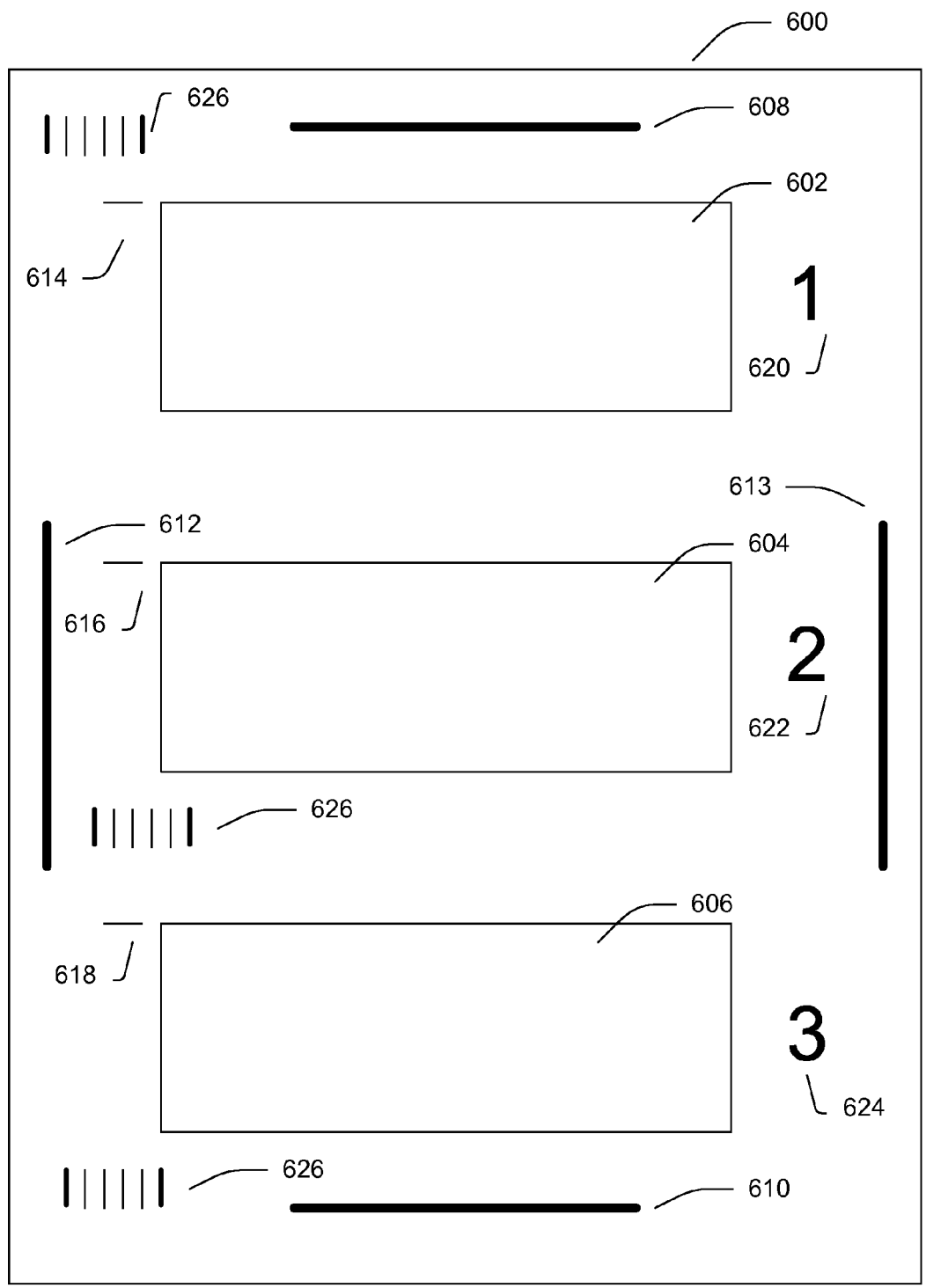
FIG. 6 is a plan view of a first example check sleeve design.
Figure 7:
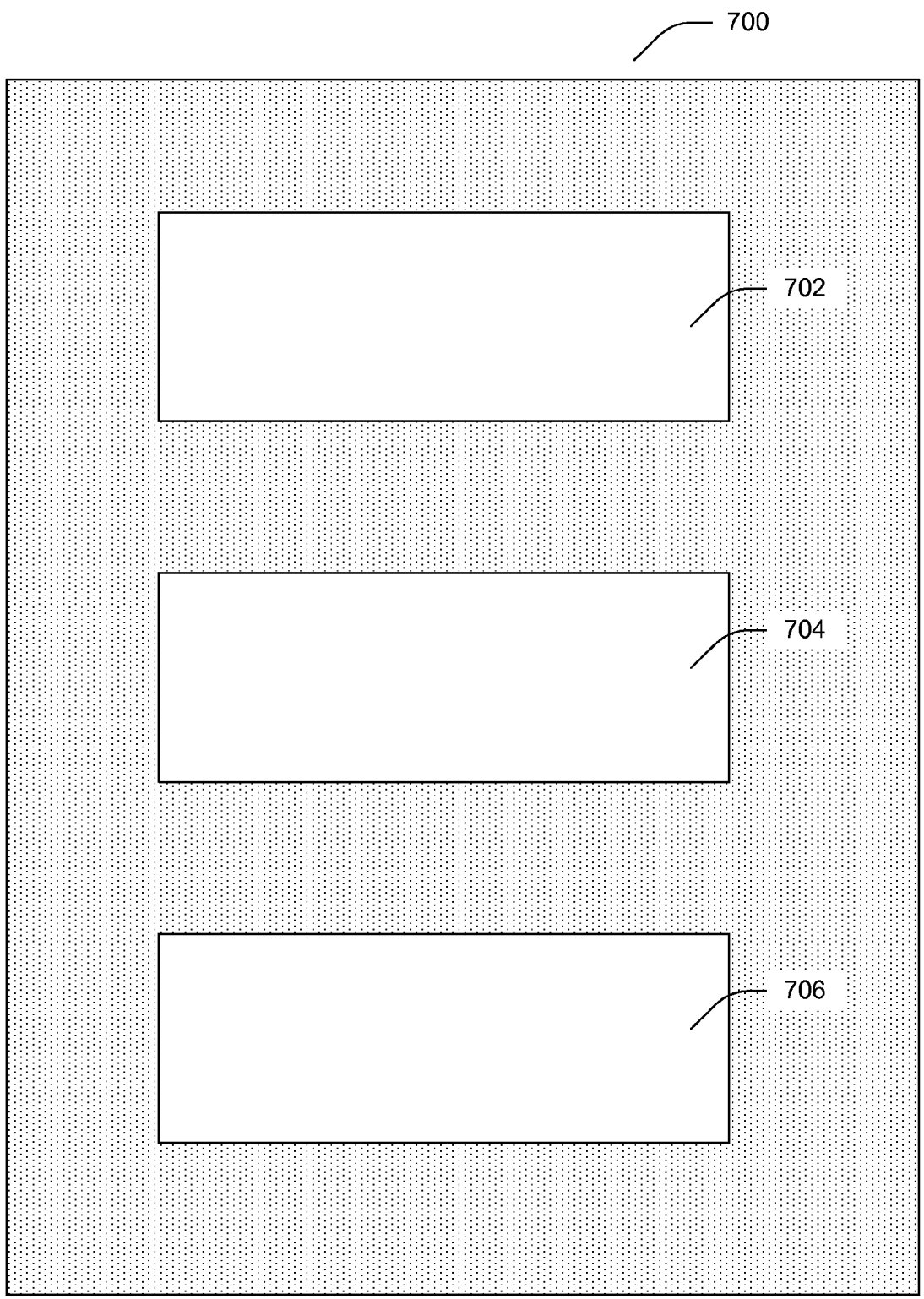
FIG. 7 is a plan view of a second example check sleeve design.
Figure 8:
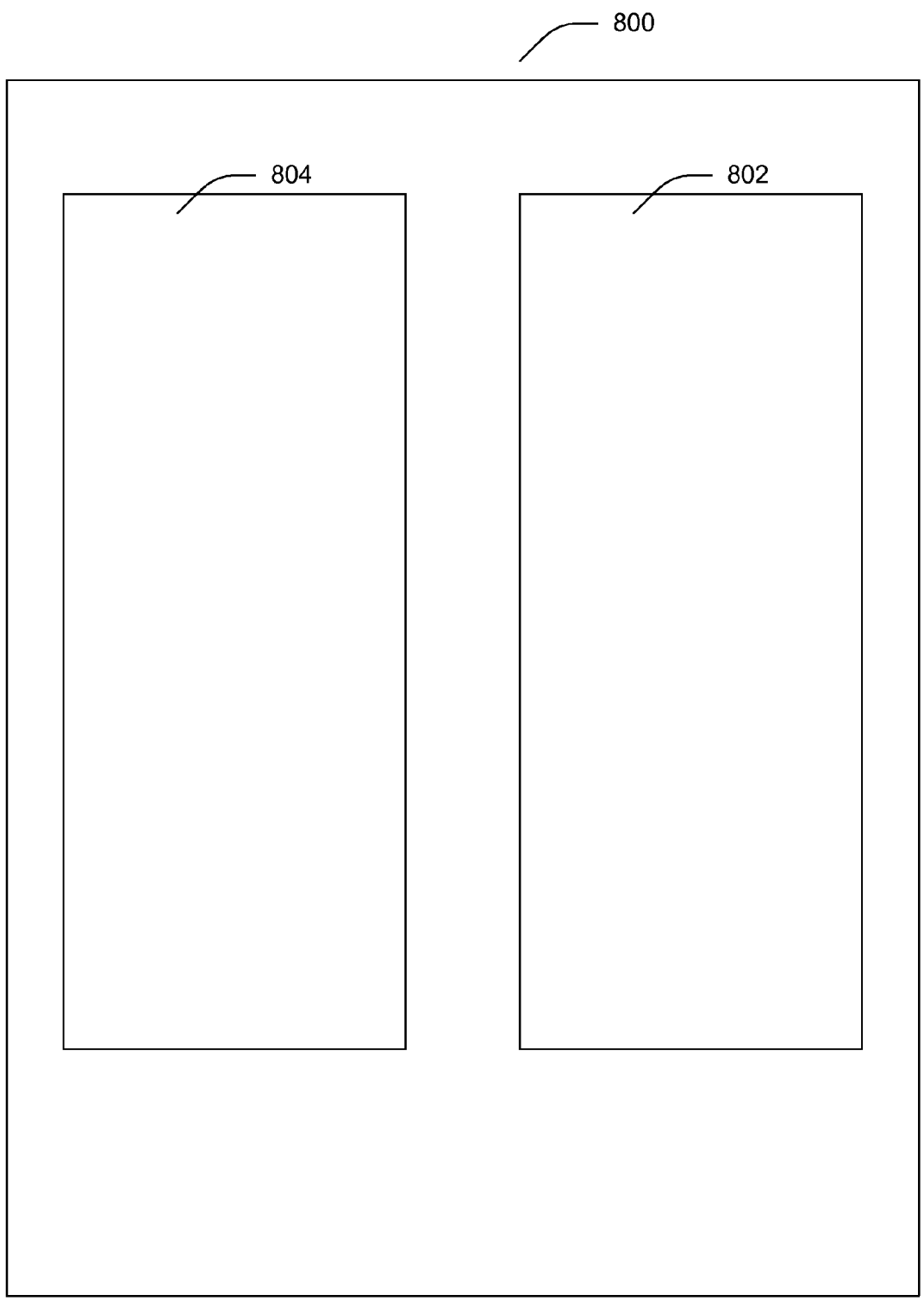
FIG. 8 is a plan view of an example check sleeve design that can be used with checks that are sized differently from personal checks.

Turning now to other aspects of a check sleeve, FIGS. 6-8 are views of various sleeves. Each of FIGS. 6-8 shows various features that may be used in a sleeve. However, the features shown can be used in any combination or sub-combination. Although each of the sleeves in FIGS. 6-8 depicts, by way of example, a certain combination of features, a sleeve could employ all of the features shown, none of the features shown, some of the features shown, and/or other features.

In FIG. 6, sleeve 600 has areas 602, 604, and 606 where checks may be placed. These areas may employ some of the mechanisms previously discussed to hold a check in place in one of those areas. Sleeve 600 has horizontal line markings 608 and 610, and vertical line markings 612 and 613. Sleeve 600 also has horizontal line markings 614, 616, and 618. Markings 614, 616, and 618 may be of a relative thickness and length that is less than that of markings 608, 610, and 612. However, any line thickness may be used, and markings may have any dimensions (thickness, length, etc.) relative to each other. In the example shown in FIG. 6, there are two thick horizontal line markings, one thick vertical line marking, and three thin horizontal line markings. However, any number of line markings can be used. The various line markings may be with an algorithm to detect the orientation and position of the sleeve, and of the checks contained in the sleeve. However, markings may be used for any reason, and orientation and position of a sleeve and of checks can also be detected using other mechanisms. Additionally, in one example the markings may have non-symmetrical features—e.g., the thin horizontal line markings 614, 616 and 618 may appear on one side of the sleeve—which may help an image processing mechanism to determine whether the view of the sleeve that is being scanned is the front or back of the sleeve.

Sleeve 600, in the example of FIG. 6, also has sequence numbers 620, 622, and 624. These numbers may assist a user in determining the order in which to place checks in the sleeve. The numbers may also be optically recognizable, and may assist an image processing mechanism to identify a particular check when the sleeve and checks are scanned. For example, a user could prompt the user to enter the amount of check number "1" (or "2", or "3"). Numbers 620, 622, and 624 would then guide the user as to which check to place in which portion of the sleeve. Moreover, when the image of the checks in the sleeve is processed, character recognition techniques could scan for numerals 620, 622, and 624, and for the checks next to those numerals, so that the images of checks can be matched with the amounts entered by the user.

Sleeve 600 may also have a barcode 626 imprinted thereon. As another example, there could be multiple barcodes 626—e.g., one barcode next to each area into which a check may be inserted. Barcode 626 could encode any type of information. For example, barcode 626 could be a code that enables a given financial institution to recognize its own sleeve, and verify that the customer is using a sleeve provided by that particular financial institution as opposed to a sleeve provided by a different financial institution. As another example, a financial institution may provide various different sleeves (e.g., sleeves for different sized checks, sleeves with different types of line markings, sleeves with different luminescence properties, etc.), and barcode 626 could be used to assist the processing of the image that results from scanning checks positioned in the sleeve. For example, if one sleeve has particular line markings or particular luminescence properties, barcode 626 could indicate those properties so that the image processing techniques can be tuned for use with the particular sleeve being used. As another example, each customer of a financial institution can be provide with one or more sleeves that are customized for that customer, and barcode 626 may encode the customer's account number, customer number, or other identifying information. If barcode 626 encodes the customer's account number or customer number, that information may be used to determine the account to which a check is to be deposited. Barcode 626 may also encode certain security techniques, such as digital signatures, to deter against counterfeit sleeves and/or counterfeit barcodes. Barcode 626 may use any format. For example, barcode 626 could be a line format, such as code 39, or a two-dimensional format, such as data matrix. There can be different barcodes for different sides of a sleeve. These barcodes could be used to determine which side of the sleeve is being scanned, and to distinguish one side of a sleeve from another. As another example, the barcode can be used to orient the angle of a scanned sheet—e.g., by detecting the skew of the lines or boundaries of the code, and correcting for the detected angle.

FIG. 7 shows another example sleeve 700. Sleeve 700 has areas 702, 704, 706 in which checks may be placed. The portion 708 of sleeve 700 that is outside of areas 702, 704, and 706 has an opaque or otherwise dark background. This dark background creates contrast with any checks that may be placed in areas 702, 704, and 706. If a flap (such as the flaps previously discussed) is used on the back of sleeve 700 to hold a check in place, the flap may be made of the same sort of opaque or dark material. A check, if present in an area of the sleeve, would cover the opaque or dark flap with material that is, by contrast, lighter in color, so the presence of a check can be detected based on where the light and dark areas appear in an image of the sleeve.

When a dark or opaque background is used, one way to detect the borders of a check is to convolve the image of the checks in the sleeve using a filter. The following is an example code fragment that can be used to perform the convolve operation, where the data array represents the filtering constants:

```
public static PlanarImage virtualEdgeEnhance(PlanarImage img)
{
  float data[ ]=
  {
  0.7f, 1f, −1.3f, 1f, 0.7f,
  0f, −1.3f, −2f, −1.3f, 0f,
  −1.3f, −2f, 35f, −2f, −1.3f,
  −0f, −1.3f, −2f, −1.3f, 0f,
  0.7f, 1f, −1.3f, 1f, 0.7f
  };
  KernelJAI kernel=new KernelJAI(new Kernel(5, 5, data));
  // Create the convolve operation.
  PlanarImage temp=JAI.create("convolve", img, kernel);
  return temp;
}
```

When this filter is used, the check images will be mostly reduced to white data.

It is also possible to apply a threshold stage before the filter using an operation described by the following code fragment:

```
Histogram histogram=(Histogram) JAI.create("histo-
gram", front).getProperty("histogram");
    double[ ] front_low=histogram.getLowValue( )
    double low[ ]={front_low[0]};
    double high[ ]={histogram.getMinFuzzinessThresholdβ
        [0]};
    double[ ] map_front={0};
    front=threshold(front, low, high, map_front);
    front=virtualEdgeEnhance(front);
    public static BufferedImage threshold(BufferedImage src,
double[ ] low, double[ ] high, double[ ] map) {
    // http://java.sun.com/products/java-
    // media/jai/forDevelopers/jai1_0_1guide-unc/Analysis-
        .doc.html#54907
    // Set up the operation parameters.
    // PlanarImage src, dst;
    // Integer [ ] low, high, map;
    // int bands=0;
    ParameterBlock pb=new ParameterBlock( )
    pb.addSource(src);
    pb.add(low);
    pb.add(high);
    pb.add(map);
    PlanarImage dst=JAI.create("threshold", pb, null);
    return dst.getAsBufferedImage( )
}
```

When this threshold is applied before the convolve operation described previously, the edges of a check may appear more clear or well-defined than without the threshold operation, although edge detection can be performed with or without the threshold. Additionally, the convolve operation described previously can also be performed with the "data" variable set to contain the following filter constants in place of those previously shown:

```
float data[ ]=
{
0.7f, 0.7f, −1.5f, 0.7f, 0.7f,
0f, 40.0f, −20f, 40.0f, 0f,
−1.3f, −20f, 20f, −20f, −1.3f,
0f, 40.0f, −20f, 40.0f, 0f,
0.7f, 0.7f, −1.5f, 2f, 0.7f
};
```

The filtering values have been determined experimentally to give good contrast between a check and a background, when applied to a sleeve such as that shown in FIG. 7.

Additionally, an image of a check can be evaluated to identify a corner of the check. When the image of the check has been process to enhance the contrast between the check and non-check regions of the image. A horizontal line of the image can be scanned horizontally to determine the boundary, at that horizontal line, between the check and non-check region. Then, the scan can move vertically to another horizontal line, and the new line can be scanned in order to determine where the boundary of the check is. The boundary occurs at some horizontal (x dimension) position along the horizontal line being scanned, and this difference in this horizontal position from line to line can be referred to as delta x. When delta x from one line to another increases markedly, it can be presumed that the increase occurs in a corner region, since the change in the horizontal position of the boundary is likely to be relatively smooth until a corner is reached. In one example, the image may be warped to make it appear flat prior to corner detection. For example, the image may have been captured with a camera, or some device that does not employ a flatbed, and the warping may be performed to correct the angle at which the image was collected. The warping may spread out colors, making them appear lighter, and some form of color correction may be used.

FIG. 8 shows an example sleeve 800 that can be used for checks that are sized differently from personal checks. Many types of checks, such as business checks, cashier's checks, teller's checks, etc., tend to be printed on different size paper than are normal personal checks, and these checks may not fit in the three-on-a-page portrait configuration shown in other figures and discussed previously. In the example of FIG. 8 areas 802 and 804 are arranged two on a page in landscape orientation to accommodate a larger check. A sleeve whose check areas are arranged in this manner may be combined with any of the techniques discussed above—e.g., flaps, corners, opaque or dark background, barcodes, line markings, etc. While check areas 802 and 804 may accommodate a check that is larger than a personal check, it should be noted that many business or bank checks are of different sizes from each other, and there may be issues as to the design of a check sleeve for checks whose size is unknown. For example, as previously discussed, the material of which a sheet is made may be cut out in the places expected for the MICR line and/or the numerical amount of a check. When the check's size is unknown, these areas may be made larger to accommodate various sized of checks, or other mechanisms may be used to hold a check in place such that the MICR line or the amount of the check is exposed through the designated area.

It should also be noted that, to the extent that an individual area of a check sleeve may or may not have a check placed in that area, a check sleeve can be configured that assists in determining whether a check has been placed within a particular area of the sleeve. For example, if the check sleeve is made of a transparent or semi-transparent material, then an area that is configured to hold a check but is empty would show a blank background when the sleeve is captured with a scanner. Such a blank background may appear as a form of noise with a high level of entropy—which would be relatively higher than an image that displays some amount of organization, such as that of a check. Thus, by comparing the entropy in a given area on an image of the sleeve with the expected level of entropy in a check image, the presence or absence of a check in a given area of the sleeve can be detected.

Figure 9:
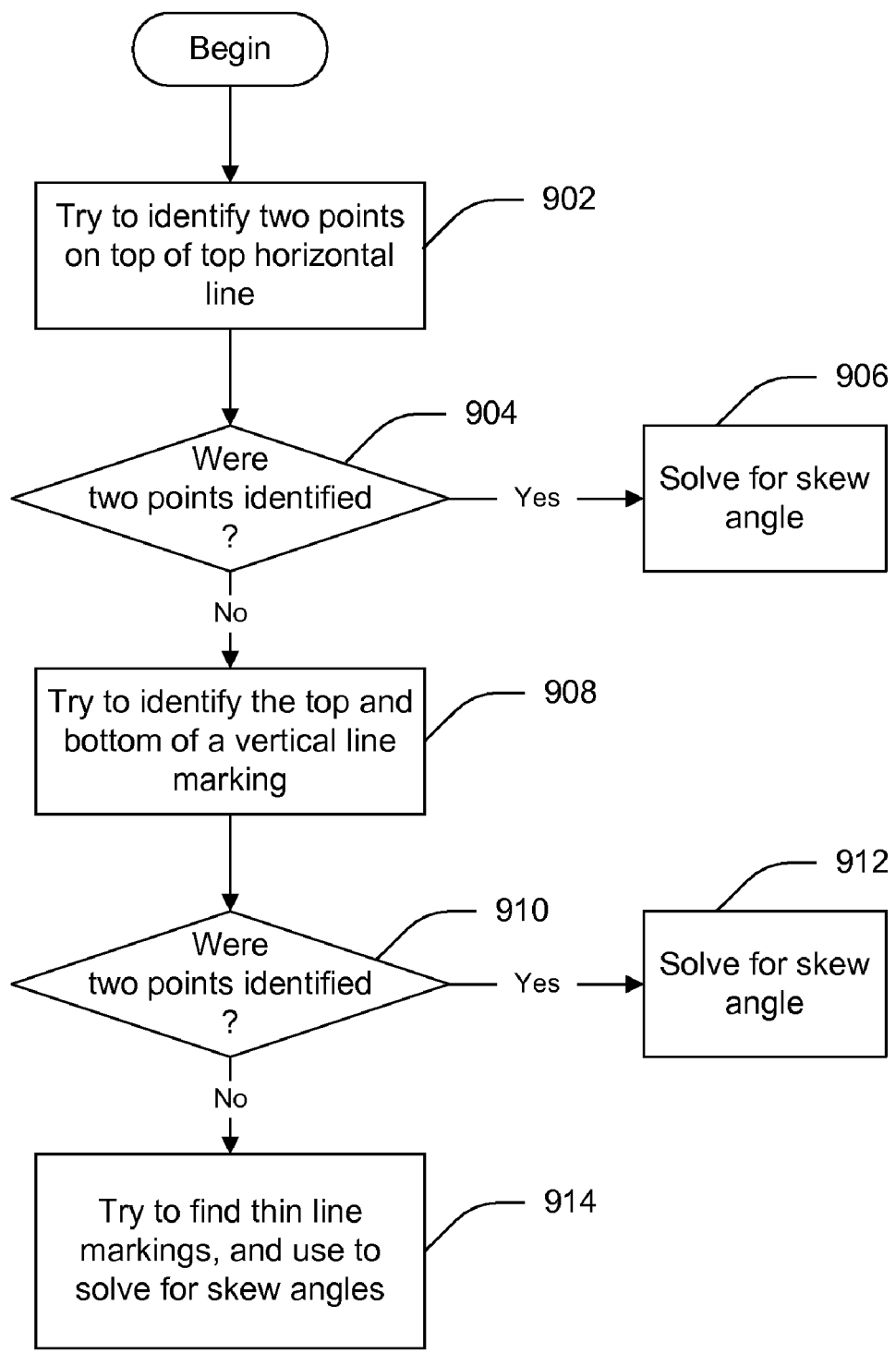
FIG. 9 is a flow diagram of an example process of orienting a check sleeve.

An image of a sleeve may be collected that is skewed at some angle, and the image of the sleeve may be oriented in order to properly interpret the images of the checks in the sleeve. As previously described in connection with FIG. 6, line markings may be printed on a sleeve which may be used to orient an image of a sleeve. FIG. 9 shows an example algorithm that uses markings shown in FIG. 6 to orient a sleeve.

At 902, an attempt is made to identify two points on the top of a thick horizontal line marking, such as marking 608 (shown in FIG. 6). One issue that arises in looking for these points is that any individual point, when taken in isolation, might be interpreted as noise. However, a point on the top of the line marking can be distinguished from random noise that happens to be the same color as the line marking by probing some number of pixels deep into the line (e.g., ten pixels) to determine if the expected color of the line marking continues to appear when probed ten pixels deep. Thus, if the image is examined from the top down and a point is encountered that appears to be the color of the line marking, then examination can continue downward. If the color continues to appear in the next several (e.g., ten) pixels examined, then it can be assumed that the initially discovered point was a point on the top of the horizontal line marking.

If two points on the top of the horizontal line marking were found (as determined at 904), then these two points define a skew angle that can be solved for. In this case, the two points are used to solve for the skew angle (at 906), which provides the orientation of the page.

If two points on the top of the horizontal line marking could not be identified, then the process continues to 908. At 908, an attempt is made to identify the tops and bottoms of the vertical line markings (e.g., line markings 612 and 613, shown in FIG. 6). If the top and bottom of one of the lines is found, then the positions of the top and bottom define a skew angle. Moreover, since the relative positions and lengths of line markings 612 and 613 is known, finding any two points (e.g., the top of one line and the bottom of another) would define an angle that could be solved for. Of the four points being searched for (the top and bottom of each of two lines), if any two of these points can be identified (as determined at 910), then the skew angle is solved for at 912.

If two points are not identified, then the thin horizontal line markings (e.g., markings 614, 616, and 618, shown in FIG. 6) are found (at 914). Points on these lines can be found, and using the found points, the relationship of the points to each other, and the known positions of the line markings, an angle can be solved for.

Figure 10:
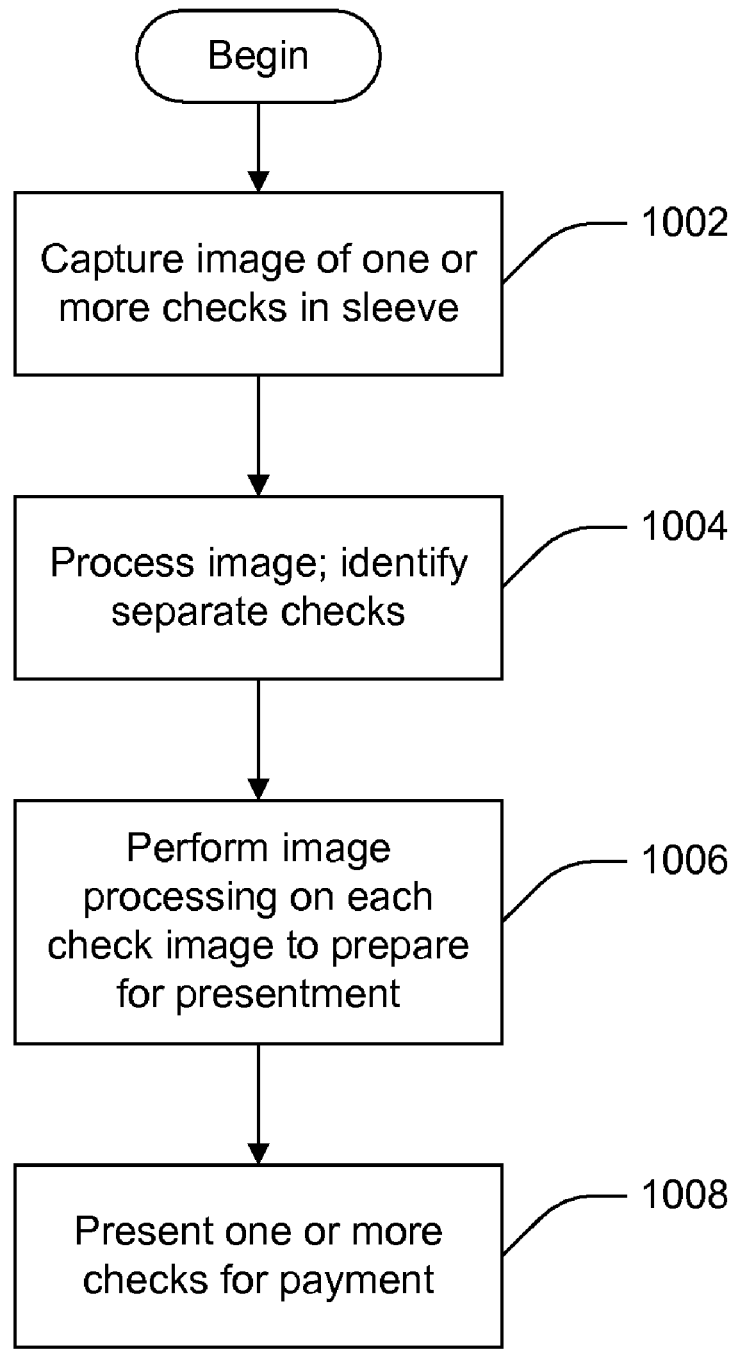
FIG. 10 is a flow diagram of an example process of capturing and presenting a check image for payment.

A reason to capture check images using the check sleeves described herein is to present images of the checks for payment. Developments in law and technology (e.g., the Check-21 law) make it possible to present an image of a check for payment in place of a physical paper check. FIG. 10 shows an example process of capturing and presenting an image of a check for payment.

At 1002, images are captured of the front and back of one or more checks in a sleeve. At 1004, the captured images are processed to identify which portion(s) of the images represent the check. The process of determining which portions of the check represent the image may include sub-processes, such as the orientation process previously described in connection with FIG. 11, or a process of finding an edge of a check image based on convolution and filtering.

At 1006, the individual check images may be processed in order to prepare them for electronic presentment. For example, any wrappers, headers, or markings, to be applied to an image, or any re-sizing or format adjustment that may be expected for presentment of a check image, can be performed at this time.

At 1008, the check images are presented for payment through a banking system—e.g., through a branch of the Federal Reserve Bank, or a commercial clearinghouse.

Figure 11:
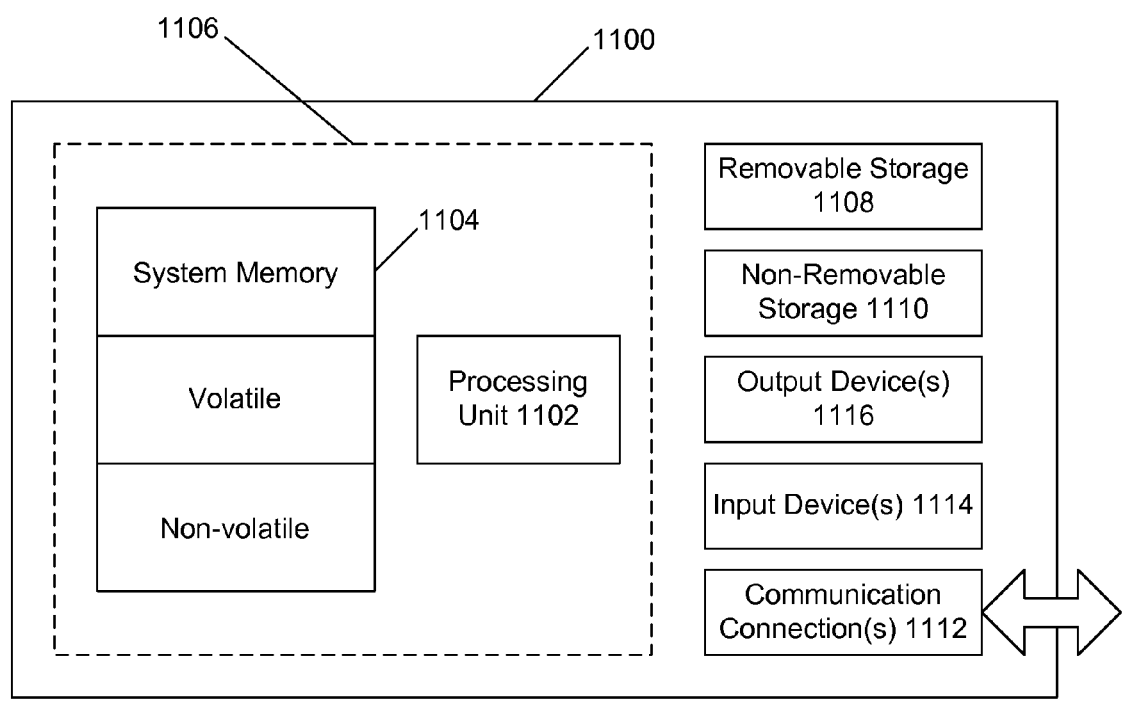
FIG. 11 is a block diagram of an example computing environment in which example embodiments and aspects may be implemented

The subject matter described herein may be implemented through the use of a computer system, or other type of device that has some computing mechanism(s). FIG. 11 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an example system for implementing aspects described herein includes a computing device, such as computing device 1100. In its most basic configuration, computing device 1100 typically includes at least one processing unit 1102 and memory 1104. Depending on the exact configuration and type of computing device, memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features/functionality. For example, computing device 1100 may include additional storage (removable and/or non-removable) including, but not limited to, magnetic or optical disks or tape. Such additional storage is illustrated in FIG. 11 by removable storage 1108 and non-removable storage 1110.

Computing device 1100 typically includes a variety of computer readable media. Computer readable media can be any available media that can be accessed by computing device 1100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 1104, removable storage 1108, and non-removable storage 1110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1100. Any such computer storage media may be part of computing device 1100.

Computing device 1100 may also contain communications connection(s) 1112 that allow the device to communicate with other devices. Communications connection(s) 1112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 1100 may also have input device(s) 1114 such as keyboard, mouse, pen, voice input device, touch input device, etc. Output device(s) 1116 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

The invention claimed is:

1. A system for obtaining an image of a check, the system comprising:
    a memory;
    a processor disposed in communication with said memory, and configured to issue a plurality of processing instructions stored in the memory, wherein the processor issues instructions to:
    receive a first image of a first side of a sleeve that holds the check, said sleeve having a first barcode printed on said first side, wherein said first barcode was encoded without using information associated with the check;
    obtain information from said first barcode to direct deposit of said check; and
    present the obtained information and said first image to a banking system for depositing the check.

2. The system of claim 1, wherein said first barcode encodes an account number of a depositor, and wherein processor further issues instructions to:
    use said first barcode to determine an account into which to deposit the check.

3. The system of claim 1, wherein said first barcode encodes a customer number of a depositor, and wherein the processor further issues instructions to:
    use said first barcode to determine that the check is to be deposited to an account associated with said depositor.

4. The system of claim 1, wherein said first barcode comprises a two-dimensional data matrix code.

5. The system of claim 1, wherein the processor further issues instructions to:
    use said first barcode to determine an orientation of said first image.

6. The system of claim 1, wherein the processor further issues instructions to:
    use said first barcode to determine a location of the check in said image.

7. The system of claim 1, wherein said first barcode encodes luminance properties of the sleeve, and wherein the processor further issues instructions to:
    use said first barcode to determine an image processing technique for processing said first image.

8. A processor-implemented method of obtaining an image of a check, the method comprising:
    receiving a first image of a first side of a sleeve that holds the check, said sleeve having a first barcode printed on said first side, wherein said first barcode was encoded without using information associated with the check;
    obtaining via a processor, information from said first barcode to direct deposit of said check; and
    presenting the obtained information and said first image to a banking system for depositing the check.

9. The method of claim 8, wherein said first barcode encodes an account number of a depositor, and wherein the method further comprises:
    using said first barcode to determine an account into which to deposit the check.

10. The method of claim 8, wherein said first barcode encodes a customer number of a depositor, and wherein the method further comprises:
    using said first barcode to determine that the check is to be deposited to an account associated with said depositor.

11. The method of claim 8, wherein said first barcode comprises a two-dimensional data matrix code.

12. The method of claim 8, further comprising: using said first barcode to determine an orientation of said first page.

13. The method of claim 8, further comprising: using said first barcode to determine a location of the check in said image.

14. The method of claim 8, wherein said first barcode encodes luminance properties of the sleeve, and wherein the processor further issues instructions to:
    use said first barcode to determine an image processing technique for processing said first image.

15. A computer-readable medium comprising computer-readable instructions for obtaining an image of a check, the computer-readable instructions executable by a processor to:
    receive a first image of a first side of a sleeve that holds the check, said sleeve having a first barcode printed on said first side, wherein said first barcode was encoded without using information associated with the check;

obtain information from said first barcode to direct deposit of said check; and present the obtained information and said first image to a banking system for depositing the check.

16. The computer-readable medium of claim 15, wherein said first barcode encodes an account number of a depositor, and wherein the computer-readable instructions further comprise instructions that:

use said first barcode to determine an account into which to deposit the check.

17. The computer-readable medium of claim 15, wherein said first barcode encodes a customer number of a depositor, and wherein the computer-readable instructions further comprise instructions that:

use said first barcode to determine that the check is to be deposited to an account associated with said depositor.

18. The computer-readable medium of claim 15, wherein said first barcode comprises a two-dimensional data matrix code.

19. The computer-readable medium of claim 15, wherein the computer-readable instructions further comprise instructions that:

use said first barcode to determine an orientation of said first page.

20. The computer-readable medium of claim 15, wherein said first barcode encodes luminance properties of the sleeve, and wherein the processor further issues instructions to:

use said first barcode to determine an image processing technique for processing said first image.

* * * * *